United States Patent
Otsu et al.

(10) Patent No.: US 11,358,428 B2
(45) Date of Patent: Jun. 14, 2022

(54) ACTIVE DAMPER UPPER MOUNT

(71) Applicant: BRIDGESTONE CORPORATION, Tokyo (JP)

(72) Inventors: Kazutaka Otsu, Tokyo (JP); Syogo Tsuji, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 192 days.

(21) Appl. No.: 16/646,373

(22) PCT Filed: Oct. 10, 2018

(86) PCT No.: PCT/JP2018/037813
§ 371 (c)(1),
(2) Date: Mar. 11, 2020

(87) PCT Pub. No.: WO2019/074026
PCT Pub. Date: Apr. 18, 2019

(65) Prior Publication Data
US 2020/0269646 A1  Aug. 27, 2020

(30) Foreign Application Priority Data

Oct. 10, 2017 (JP) .............................. JP2017-197035
Nov. 21, 2017 (JP) .............................. JP2017-223324
(Continued)

(51) Int. Cl.
*B60G 13/00* (2006.01)
*F16F 9/54* (2006.01)
*F16F 3/093* (2006.01)

(52) U.S. Cl.
CPC ............ *B60G 13/003* (2013.01); *F16F 3/093* (2013.01); *F16F 9/54* (2013.01); *B60G 2202/14* (2013.01);
(Continued)

(58) Field of Classification Search
CPC .............. B60G 13/03; B60G 2204/128; B60G 2202/14; B60G 2202/24; B60G 2206/41;
(Continued)

(56) References Cited

U.S. PATENT DOCUMENTS 3,448,949 A * 6/1969 Kelley .................... F16M 7/00
267/140.3
4,286,777 A * 9/1981 Brown ................. B60G 99/004
267/294
(Continued)

FOREIGN PATENT DOCUMENTS

CN  1282686 A  2/2001
CN  103109105 A  5/2013
(Continued)

OTHER PUBLICATIONS

Search Report dated Mar. 5, 2021 from the China National Intellectual Property Administration in CN Application No. 201880065024.1.
(Continued)

*Primary Examiner* — Robert A. Siconolfi
*Assistant Examiner* — James K Hsiao
(74) *Attorney, Agent, or Firm* — Sughrue Mion, PLLC

(57) ABSTRACT

The active damper upper mount includes an inner member (11, 111) to which an upper end portion of a rod (22, 122) of an active damper (21, 121) is fixed, an intermediate member (12, 112) that surrounds the inner member in a circumferential direction around a rod axis (O1, O2), an outer member (13, 113) that surrounds the intermediate member in the circumferential direction and is attached to a vehicle body side, a first elastic body (14, 114) that is disposed between the inner member and the intermediate member and supports the inner member and the intermediate member so as to be elastically displaceable relative to each
(Continued)

other, and a second elastic body (15, 115) that is disposed between the intermediate member and the outer member and supports the intermediate member and the outer member so as to be elastically displaceable relative to each other.

16 Claims, 5 Drawing Sheets

(30) Foreign Application Priority Data

Nov. 21, 2017 (JP) .............................. JP2017-223325
Nov. 21, 2017 (JP) .............................. JP2017-223326

(52) U.S. Cl.
CPC .... *B60G 2202/24* (2013.01); *B60G 2204/128* (2013.01); *B60G 2206/41* (2013.01); *B60G 2206/82092* (2013.01); *B60G 2500/10* (2013.01); *B60G 2800/162* (2013.01); *F16F 2226/045* (2013.01); *F16F 2230/04* (2013.01); *F16F 2234/02* (2013.01)

(58) Field of Classification Search
CPC ...... B60G 2206/82092; B60G 2500/10; B60G 2800/162; F16F 3/093; F16F 9/54; F16F 2226/045; F16F 2230/04; F16F 2234/02
USPC ........................................................ 267/292
See application file for complete search history.

(56) References Cited

U.S. PATENT DOCUMENTS

| | | | | |
|---|---|---|---|---|
| 4,416,446 A * | 11/1983 | Murakami | ............ | B60K 13/02 267/140.3 |
| 4,465,296 A * | 8/1984 | Shiratori | ............. | B60G 15/068 267/220 |
| 5,040,775 A * | 8/1991 | Miyakawa | ........... | B60G 13/003 267/220 |
| 5,064,176 A * | 11/1991 | Goto | .................... | B60G 15/068 267/140.11 |
| 5,088,704 A * | 2/1992 | Kanda | .................. | B60G 13/003 267/140.13 |
| 5,158,269 A * | 10/1992 | Hein | ..................... | B60G 13/003 267/220 |
| 5,165,669 A * | 11/1992 | Mayerbock | ............. | F16F 13/24 267/140.12 |
| 5,182,888 A * | 2/1993 | Miyamoto | ............. | E04H 9/022 52/167.2 |
| 5,257,730 A * | 11/1993 | Nakaura | ................. | F16F 3/093 267/140.3 |
| 5,467,970 A * | 11/1995 | Ratu | ........................ | B60G 7/04 267/152 |
| 5,467,971 A * | 11/1995 | Hurtubise | ............ | B60G 15/068 188/322.12 |
| 5,664,650 A * | 9/1997 | Kammel | ............. | B60G 15/067 188/321.11 |
| 5,775,720 A * | 7/1998 | Kmiec | ................. | B60G 15/067 188/322.15 |
| 5,799,930 A * | 9/1998 | Willett | ................... | B62D 24/02 267/141.4 |
| 5,890,706 A * | 4/1999 | Court | ...................... | F16F 13/10 267/220 |
| 5,899,431 A * | 5/1999 | Lefol | ...................... | F16F 1/387 267/219 |
| 6,007,061 A * | 12/1999 | Kammel | ............. | B60G 15/068 188/321.11 |
| 6,398,202 B1 | 6/2002 | Schaible | | |
| 6,427,814 B1 * | 8/2002 | Miyamoto | ........... | B60G 15/067 188/321.11 |
| 6,502,883 B2 * | 1/2003 | Rice | ........................ | F16F 15/08 296/35.1 |
| 6,616,160 B2 * | 9/2003 | Tadano | ................ | B60G 15/067 267/220 |
| 6,666,311 B1 | 12/2003 | Schütz | | |
| 6,712,370 B2 * | 3/2004 | Kawada | ............... | B60G 13/003 280/124.155 |
| 6,764,066 B2 * | 7/2004 | Graeve | ................ | B60G 13/003 188/321.11 |
| 6,969,053 B2 * | 11/2005 | Kawada | ............... | B60G 13/003 267/220 |
| 7,178,795 B2 * | 2/2007 | Huprikar | ............. | B60G 13/003 248/560 |
| 7,311,181 B2 * | 12/2007 | Germano | ............. | B60G 13/003 188/321.11 |
| 7,503,552 B2 * | 3/2009 | Huprikar | .................. | F16F 1/37 267/140.13 |
| 8,556,047 B2 * | 10/2013 | Kondou | .................... | F16F 9/54 188/283 |
| 8,668,213 B2 * | 3/2014 | Takagi | ................. | B60G 15/063 280/124.147 |
| 8,813,924 B2 * | 8/2014 | Matsumura | .......... | B60G 15/068 188/321.11 |
| 8,960,696 B2 * | 2/2015 | McMullen | ........... | B60G 15/067 280/124.155 |
| 9,038,997 B2 * | 5/2015 | Bradshaw | ............... | F16F 13/16 267/292 |
| 9,132,709 B2 * | 9/2015 | Endo | ..................... | B60G 13/003 |
| 9,302,561 B2 * | 4/2016 | Itou | ........................... | F16F 9/54 |
| 9,308,795 B2 * | 4/2016 | Matsushita | .......... | B60G 15/067 |
| 9,452,651 B2 * | 9/2016 | Toyota | ................. | B60G 13/003 |
| 9,829,036 B2 * | 11/2017 | Kondor | ................. | F16F 1/3863 |
| 10,427,488 B2 * | 10/2019 | Krishnan | ............. | B60G 17/056 |
| 2005/0133322 A1 * | 6/2005 | Huprikar | ............. | B60G 15/067 188/321.11 |
| 2005/0155829 A1 * | 7/2005 | Germano | ............. | B60G 13/003 188/321.11 |
| 2006/0151928 A1 * | 7/2006 | Tamura | ................ | B60G 13/003 267/219 |
| 2009/0020930 A1 * | 1/2009 | Wirges | ................. | B60G 15/068 267/140.13 |
| 2013/0168941 A1 | 7/2013 | Takagi et al. | | |
| 2015/0158362 A1 * | 6/2015 | Palka | ..................... | B60G 15/06 267/30 |
| 2015/0367699 A1 * | 12/2015 | Toyota | ................. | B60G 13/003 280/124.109 |
| 2018/0370316 A1 * | 12/2018 | Priess | ................... | F16F 9/0454 |
| 2021/0270342 A1 * | 9/2021 | Deferme | .............. | F16F 9/3271 |

FOREIGN PATENT DOCUMENTS

| | | |
|---|---|---|
| EP | 0046508 A2 | 3/1982 |
| EP | 0482296 B1 | 3/1994 |
| JP | 60-75110 U | 5/1985 |
| JP | 61-99731 A | 5/1986 |
| JP | 2004-278598 A | 10/2004 |
| JP | 2006-084007 A | 3/2006 |
| JP | 2010-281412 A | 12/2010 |
| JP | 2012-180872 A | 9/2012 |
| JP | 5290875 B2 * | 9/2013 |

OTHER PUBLICATIONS

International Search Report of PCT/JP2018/037813 dated Nov. 13, 2018 [PCT/ISA/210].
Extended European Search Report dated Jul. 19, 2021 from the European Patent Office in Application No. 18866567.3.

\* cited by examiner

ACTIVE DAMPER UPPER MOUNT

TECHNICAL FIELD

The present invention relates to an active damper upper mount.

Priority is claimed on Japanese Patent Application No. 2017-197035, filed in Japan on Oct. 10, 2017, Japanese Patent Application No. 2017-223324, filed in Japan on Nov. 21, 2017, Japanese Patent Application No. 2017-223325, filed in Japan on Nov. 21, 2017, and Japanese Patent Application No. 2017-223326, filed in Japan on Nov. 21, 2017, the contents of which are incorporated herein by reference.

BACKGROUND ART

Conventionally, an upper mount, as illustrated in the following Patent Document 1, including an inner member to which an upper end portion of a rod of a damper is fixed, an intermediate member that surrounds the inner member in a circumferential direction around a rod axis, an outer member that surrounds the intermediate member in the circumferential direction and is attached to a vehicle body side, and an elastic body that is disposed between the inner member and the intermediate member and supports the inner member and the intermediate member so as to be elastically displaceable relative to each other, has been known.

An active damper including a drive unit capable of controlling a damping force to be exerted is known.

CITATION LIST

Patent Document

[Patent Document 1] Japanese Unexamined Patent Application, First Publication No. 2012-180872

SUMMARY OF INVENTION

Technical Problem

However, if the related-art upper mount is applied to an active damper, when a large control force in a direction of a rod axis is applied to a rod by a drive unit, an elastic body is compressively deformed in large amount in the direction of the rod axis and becomes excessively hard. In this state, if vibration is transmitted to the rod from a tire, the drive unit of the active damper, or the like, there is a possibility that, irrespective of the height of frequency, this vibration is not damped and absorbed by the elastic body and this vibration is transmitted to a vehicle body.

The invention has been made in view of the aforementioned circumstances, and an object thereof is to provide an active damper upper mount which, in a state where a large control force in a direction of a rod axis is applied to a rod of an active damper, is capable of damping and absorbing vibration transmitted to the rod from a tire, a drive unit of the active damper, or the like irrespective of the height of frequency.

Solution to Problem

A first aspect of an active damper upper mount according to the invention includes: an inner member to which an upper end portion of a rod of an active damper is fixed; an intermediate member that surrounds the inner member in a circumferential direction around a rod axis; an outer member that surrounds the intermediate member in the circumferential direction and is attached to a vehicle body side; a first elastic body that is disposed between the inner member and the intermediate member and supports the inner member and the intermediate member so as to be elastically displaceable relative to each other; and a second elastic body that is disposed between the intermediate member and the outer member and supports the intermediate member and the outer member so as to be elastically displaceable relative to each other.

Advantageous Effects of Invention

According to this invention, vibration transmitted to a rod of an active damper from a tire, a drive unit of the active damper, or the like, in a state where a large control force in a direction of a rod axis is applied to the rod, can be damped and absorbed irrespective of the height of frequency.

DESCRIPTION OF EMBODIMENTS

First Embodiment

Figure 1:
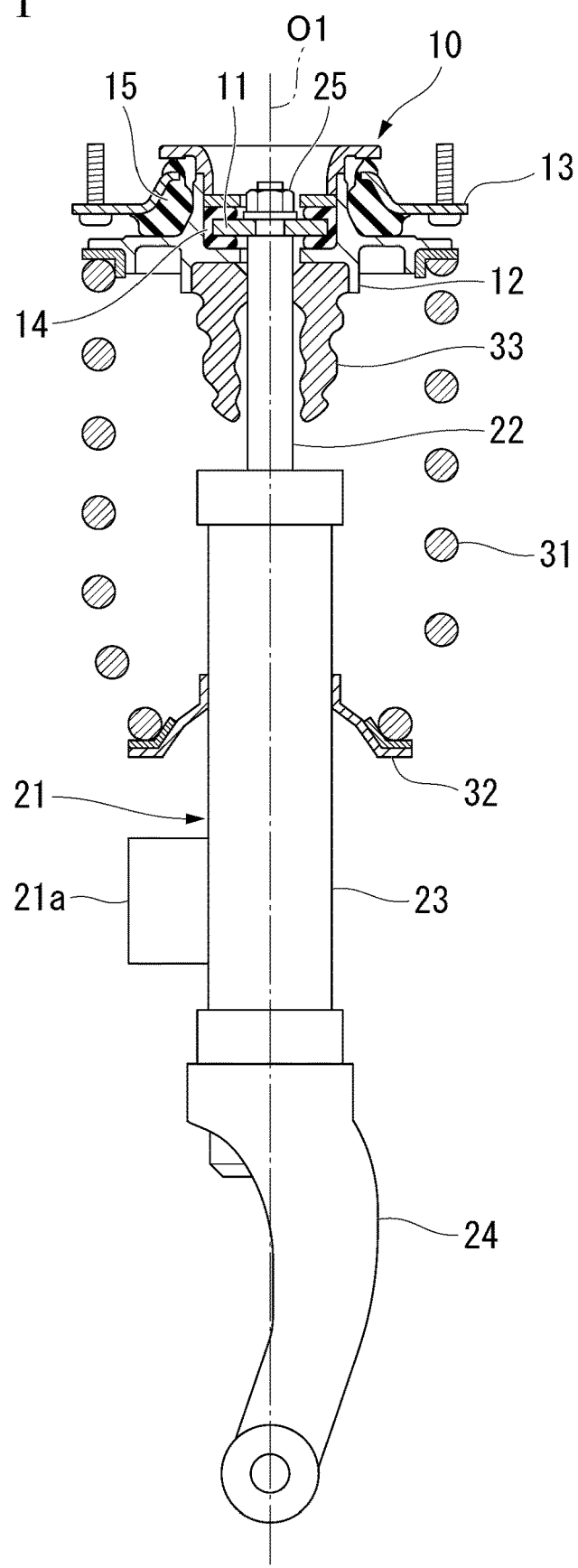
FIG. 1 is a longitudinal sectional view illustrating a state where an active damper is mounted on an active damper upper mount according to a first embodiment of the invention.

Hereinafter, a first embodiment of an active damper upper mount according to the invention will be described referring to FIGS. 1 and 2. An active damper upper mount 10 is applied to, for example, a double-wishbone suspension.

The active damper 21 extends in a substantially upward-downward direction and includes a rod 22 and a cylinder 23. The rod 22 and the cylinder 23 are disposed coaxially with a common axis. Hereinafter, the common axis is referred to as a rod axis O1, and a direction that intersects the rod axis O1 as viewed from the direction of the rod axis O1 is referred to as a radial direction.

The rod 22 protrudes upward from the cylinder 23. A portion of the rod 22 protruding upward from the cylinder 23 is surrounded from the outer side in the radial direction by a bump stopper 33. A male thread is formed at an upper end portion of the rod 22. A bracket 24 coupled to an arm member that is not illustrated is attached to a lower end portion of the cylinder 23. A drive unit 21a, which adjusts a damping force exerted by the active damper 21, for example, depending on the frequency or the like of input vibration, is attached to an outer peripheral surface of the cylinder 23. The drive unit 21a includes, for example, a pump or the like. A lower support plate 32, which supports a lower end portion of a spring 31, is attached to the outer peripheral surface of the cylinder 23. The lower support plate 32 is annularly formed and is disposed coaxially with the rod axis O1.

The active damper upper mount 10 includes an inner member 11, an intermediate member 12, an outer member 13, a first elastic body 14, and a second elastic body 15. The upper end portion of the rod 22 of the active damper 21 is fixed to the inner member 11. The intermediate member 12 surrounds the inner member 11 in a circumferential direction around the rod axis O1. The outer member 13 surrounds the intermediate member 12 in the circumferential direction and is attached to a vehicle body side. The first elastic body 14 is disposed between the inner member 11 and the intermediate member 12 and supports the inner member 11 and the intermediate member 12 so as to be elastically displaceable relative to each other. The second elastic body 15 is disposed between the intermediate member 12 and the outer member 13 and supports the intermediate member 12 and the outer member 13 so as to be elastically displaceable relative to each other.

The inner member 11 is annularly formed, and the upper end portion of the rod 22 is inserted into the inner member 11. As a nut 25 is screwed to a portion of the upper end portion of the rod 22 protruding upward from the inner member 11, the active damper 21 is attached to the active damper upper mount 10. The inner member 11 is disposed coaxially with the rod axis O1.

Figure 2:
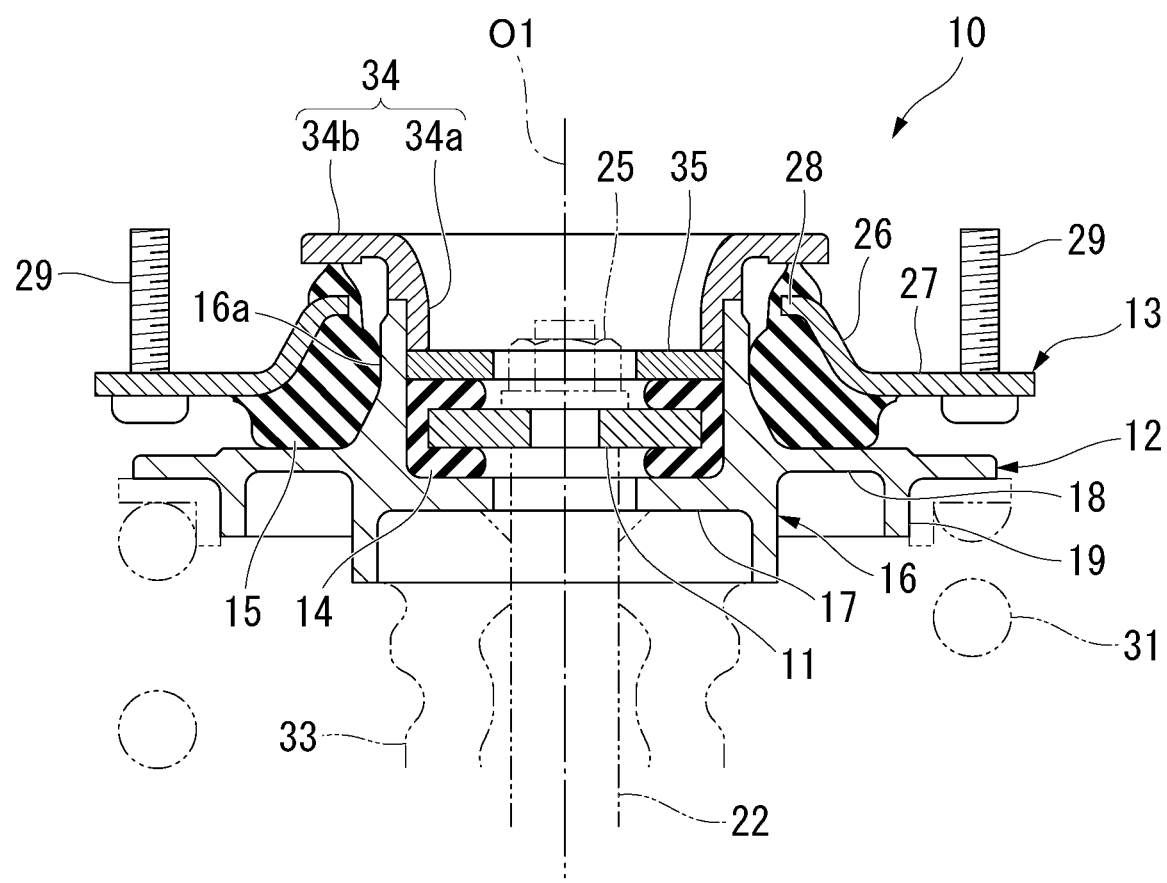
FIG. 2 is an enlarged longitudinal sectional view of the active damper upper mount illustrated in FIG. 1.

The intermediate member 12, as illustrated in FIG. 2, includes a body tube 16, an annular supporting plate 17, an annular upper support plate 18, and a fitting tube 19. The annular supporting plate 17 protrudes inward in the radial direction from an inner peripheral surface of the body tube 16. The annular upper support plate 18 protrudes outward in the radial direction from an outer peripheral surface of the body tube 16. The fitting tube 19 protrudes downward from the upper support plate 18. The body tube 16, the supporting plate 17, the upper support plate 18, and the fitting tube 19 are disposed coaxially with the rod axis O1.

The portion of the rod 22 protruding upward from the cylinder 23 is inserted into each of the body tube 16 and the supporting plate 17. The supporting plate 17 and the upper support plate 18 are located at an intermediate portion of the body tube 16 in the direction of the rod axis O1. The supporting plate 17 is located below the upper support plate 18.

The inner member 11 is disposed in a portion located above the supporting plate 17 inside the body tube 16. An upper end portion of the bump stopper 33 is fitted within the body tube 16 at a portion located below the supporting plate 17. A lower end opening edge of the body tube 16 is located below a lower end opening edge of the fitting tube 19.

A portion of a lower surface of the upper support plate 18 located radially outside the fitting tube 19, and an outer peripheral surface of the fitting tube 19 support an upper end portion of the spring 31.

The outer member 13 includes a surrounding tube 26, a flange 27, and a stopper protrusion 28. The surrounding tube 26 surrounds an upper part 16a of the body tube 16 of the intermediate member 12, which is located above the upper support plate 18, from the outside in the radial direction. The flange 27 protrudes outward in the radial direction from a lower end portion of the surrounding tube 26 and covers the upper support plate 18 from above. The stopper protrusion 28 protrudes inward in the radial direction from an upper end portion of the surrounding tube 26. The surrounding tube 26, the flange 27, and the stopper protrusion 28 are disposed coaxially with the rod axis O1.

The diameter of the surrounding tube 26 gradually increases from the top toward the bottom. A plurality of through-holes are formed in the flange 27 at intervals in the circumferential direction, and the outer member 13 is attached to the vehicle side by bolts 29 being respectively inserted into the through-holes.

The positions of the upper end opening edges of the stopper protrusion 28 and the body tube 16 in the direction of the rod axis O1 are equal to each other. An inner peripheral edge of the stopper protrusion 28 is located radially outside the outer peripheral surface of the body tube 16.

Here, a rebound stopper 34 is mounted within the upper end portion of the body tube 16 of the intermediate member 12. The rebound stopper 34 includes a mounting tube 34a fitted within the upper end portion of the body tube 16, and an annular stopper part 34b protruding outward in the radial direction from an upper end portion of the mounting tube 34a. The mounting tube 34a and the stopper part 34b are disposed coaxially with the rod axis O1. The stopper part 34b is located above the stopper protrusion 28 of the outer member 13 and faces an upper surface of the stopper protrusion 28 in the direction of the rod axis O1.

The second elastic body 15 abuts an outer peripheral surface of the upper part 16a of the body tube 16 and an upper surface of the upper support plate 18 in the intermediate member 12, an inner peripheral surface of the surrounding tube 26, a lower surface of the flange 27, and the stopper protrusion 28 in the outer member 13, and a lower surface of the stopper part 34b in the rebound stopper 34.

In the illustrated example, the second elastic body 15 is vulcanized and bonded to the outer member 13 and abuts the intermediate member 12 and the rebound stopper 34 in a non-bonded state. The second elastic body 15 is annularly formed and is disposed coaxially with the rod axis O1. The second elastic body 15 is externally fitted to the upper part 16a of the body tube 16 of the intermediate member 12 in a state where the second elastic body 15 is compressively deformed outward in the radial direction. The second elastic body 15 is disposed between the intermediate member 12 and the outer member 13 in a state where the second elastic body 15 is compressively deformed in the direction of the rod axis O1.

The second elastic body 15 may be split into a portion that abuts the surrounding tube 26 and the flange 27, and a portion that abuts the stopper protrusion 28. The second elastic body 15 may abut the outer member 13 in a non-bonded state and may be vulcanized and bonded to at least one of the intermediate member 12 and the rebound stopper 34. The second elastic body 15 may be in non-contact with the stopper part 34b of the rebound stopper 34.

An annular presser plate 35 is disposed within the body tube 16 of the intermediate member 12, and a lower end opening edge of the mounting tube 34a of the rebound stopper 34 abuts or is close to the presser plate 35. The presser plate 35 is disposed above the inner member 11. The nut 25 is disposed inside the presser plate 35.

The first elastic body 14 abuts a portion of the inner peripheral surface of the body tube 16 located above the supporting plate 17 and an upper surface of the supporting plate 17 in the intermediate member 12, an upper surface, a lower surface, and an outer peripheral surface of the inner member 11, and a lower surface of the presser plate 35. The first elastic body 14 is compressively deformed in both the direction of the rod axis O1 and the radial direction. The first elastic body 14 abuts the presser plate 35, the intermediate member 12, and the inner member 11 in a non-bonded state.

The first elastic body 14 may be bonded to at least one of the presser plate 35, the intermediate member 12, and the inner member 11.

The thickness, in the direction of the rod axis O1, of a portion of the first elastic body 14 located between the lower surface of the presser plate 35 and the upper surface of the inner member 11, and the thickness, in the direction of the rod axis O1, of a portion of the first elastic body 14 located between the upper surface of the supporting plate 17 and the lower surface of the inner member 11, and the thickness, in the radial direction, of a portion of the first elastic body 14 located between the portion of the inner peripheral surface of the body tube 16 of the intermediate member 12, which is located above the supporting plate 17, and the outer peripheral surface of the inner member 11 are equal to each other. These respective thicknesses may be made different from each other.

The volume of the second elastic body 15 is larger than the volume of the first elastic body 14.

The thickness, in the radial direction, of a portion of the second elastic body 15 located between the outer peripheral surface of the upper part 16a of the body tube 16 of the intermediate member 12 and the inner peripheral surface of the surrounding tube 26 of the outer member 13 is larger than the thickness, in the radial direction, of the portion of the first elastic body 14 located between the portion of the inner peripheral surface of the body tube 16 of the intermediate member 12, which is located above the supporting plate 17, and the outer peripheral surface of the inner member 11.

The thickness, in the direction of the rod axis O1, of a portion of the second elastic body 15 located between the upper surface of the upper support plate 18 of the intermediate member 12 and the lower surface of the flange 27 of the outer member 13 is larger than the thickness, in the direction of the rod axis O1, of the portion of the first elastic body 14 located between the lower surface of the presser plate 35 and the upper surface of the inner member 11, and the thickness, in the direction of the rod axis O1, of the portion of the first elastic body 14 located between the upper surface of the supporting plate 17 and the lower surface of the inner member 11.

The first elastic body 14 is formed of a first rubber material having a static spring constant higher than that of a second rubber material that forms the second elastic body 15.

The static spring constant can be measured by the method defined in "Reciprocation System" in Section 6.5 "Testing Method" in Section 6 "Static Spring Characteristics Test" in JIS K 6385:2012. As for measurement conditions (Section 6.4 "Testing Conditions" in JIS K 6385:2012), the test temperature can be equivalent to a usage environment in an applicable vehicle.

tan δ of the second rubber material is larger than tan δ of the first rubber material. tan δ can be measured using a dynamic tensile viscoelasticity measuring device (for example, spectrometer made by Ueshima Seisakusho Co., Ltd.) at a measurement temperature of 25° C., an initial strain of 5%, a dynamic strain of 2%, and a frequency of 10 Hz.

The dynamic spring constant of the first rubber material is lower than the dynamic spring constant of the second rubber material.

A dynamic spring constant Kd can be measured by the method defined in Section 6.1.1 "When Being Based on Load Waveform and Deflection Waveform" in Section 6.1 "Non-resonant Method" in The Society of Rubber Industry, Japan Standard (SRIS) 3503-1990. As for the measurement conditions (Section 4.3 "Specified Conditions of Test" in SRIS 3503-1990), the test temperature can be equivalent to a usage environment in an applicable vehicle, the number of test vibrations can be around an unsprung resonant frequency of the applicable vehicle, and the mean load can be equivalent to spring 1G load of the applicable vehicle, the load amplitude can be a usage condition in the applicable vehicle.

As described above, according to the active damper upper mount 10 of the present embodiment, the second elastic body 15 is disposed between the intermediate member 12 and the outer member 13. Hence, even if the vibration transmitted to the rod 22 from a tire, the drive unit 21a of the active damper 21, or the like, in a state where a large controlling force in the direction of the rod axis O1 is applied to the rod 22 of the active damper 21, is not damped and absorbed by the first elastic body 14, it is possible to damp and absorb this vibration with the second elastic body 15, and transmission of this vibration to a vehicle body can be suppressed.

Additionally, the static spring constant of the first rubber material is higher than the static spring constant of the second rubber material. Hence, even if a large controlling force in the direction of the rod axis O1 is applied to the rod 22 of the active damper 21, it is possible to suppress that the first elastic body 14 is compressively deformed in large amount in the directing of the rod axis O1 and becomes excessively hard. Hence, the vibration transmitted to the rod 22 from a tire, the drive unit 21a of the active damper 21, or the like, in a state where a large controlling force in the direction of the rod axis O1 is applied to the rod 22 of the active damper 21, can be damped and absorbed not only by the second elastic body 15 but also by the first elastic body 14 irrespective of the height of frequency, and the transmission of this vibration to the vehicle body can be suppressed.

Additionally, since the amount of compressive deformation of the first elastic body 14 in the direction of the rod axis O1 is suppressed, it is possible to suppress a load applied to the first elastic body 14, and the durability of the first elastic body 14 can also be secured.

Particularly, the first elastic body 14 and the second elastic body 15 are separately disposed between the inner member 11 and the intermediate members 12 on a vibration generation unit side to which the rod 22 is fixed and between the outer member 13 and the intermediate members 12 on a vibration reception unit side attached to the vehicle body side. That is, the intermediate member 12 is sandwiched by the first elastic body 14 and the second elastic body 15 between the vibration generation unit side and the vibration reception unit side. Hence, when high-frequency vibration is transmitted to the rod 22 from a tire, the drive unit 21a of the active damper 21, or the like, the intermediate member 12 can be made difficult to vibrate due to the inertia weight thereof. In other words, the intermediate member 12 can be made to act as a mass of a dynamic damper. Hence, the transmission of the high-frequency vibration to the vehicle body can be reliably suppressed.

Additionally, tan δ of the second rubber material is larger than tan δ of the first rubber material. Hence, when the intermediate member 12 tries to resonate due to the vibration transmitted to the rod 22, this resonance can be suppressed by the damping force of the second elastic body 15.

Additionally, tan δ of the second rubber material with the low static spring constant is larger than tan δ of the first rubber material with the high static spring constant. Hence, the high-frequency vibration transmitted to the rod 22 from a tire, the drive unit 21a of the active damper 21, or the like can be effectively damped and absorbed by the second elastic body 15, and the transmission of this vibration to the vehicle body can be suppressed.

Additionally, the dynamic spring constant of the first rubber material is lower than the dynamic spring constant of the second rubber material. Hence, before the high-frequency vibration transmitted to the rod 22 from a tire, the drive unit 21a of the active damper 21, or the like reaches the second elastic body 15, the high-frequency vibration is easily and effectively damped and absorbed by the first elastic body 14, and the transmission of this vibration to the vehicle body can be reliably suppressed.

Note that the technical scope of the invention is not limited to the above embodiment, and various changes can be made without departing the spirit of the invention.

In the above embodiment, a configuration including the rebound stopper 34, the presser plate 35, and the stopper protrusion 28 of the outer member 13 has been shown. However, a configuration having no these may be adopted.

In the above embodiment, a configuration in which the second elastic body 15 has a portion located between the stopper protrusion 28 and the stopper part 34b of the rebound stopper 34 as has been shown. However, a configuration having no this portion may be adopted.

In the above embodiment, a configuration in which tan δ of the second rubber material is larger than tan δ of the first rubber material has been shown. However, tan δ of the second rubber material may be equal to or lower than tan δ of the first rubber material.

In the above embodiment, a configuration in which the dynamic spring constant of the first rubber material is lower than the dynamic spring constant of the second rubber material has been shown. However, the dynamic spring constant of the first rubber material may be equal to or more than the dynamic spring constant of the second rubber material.

Second Embodiment

Figure 3:
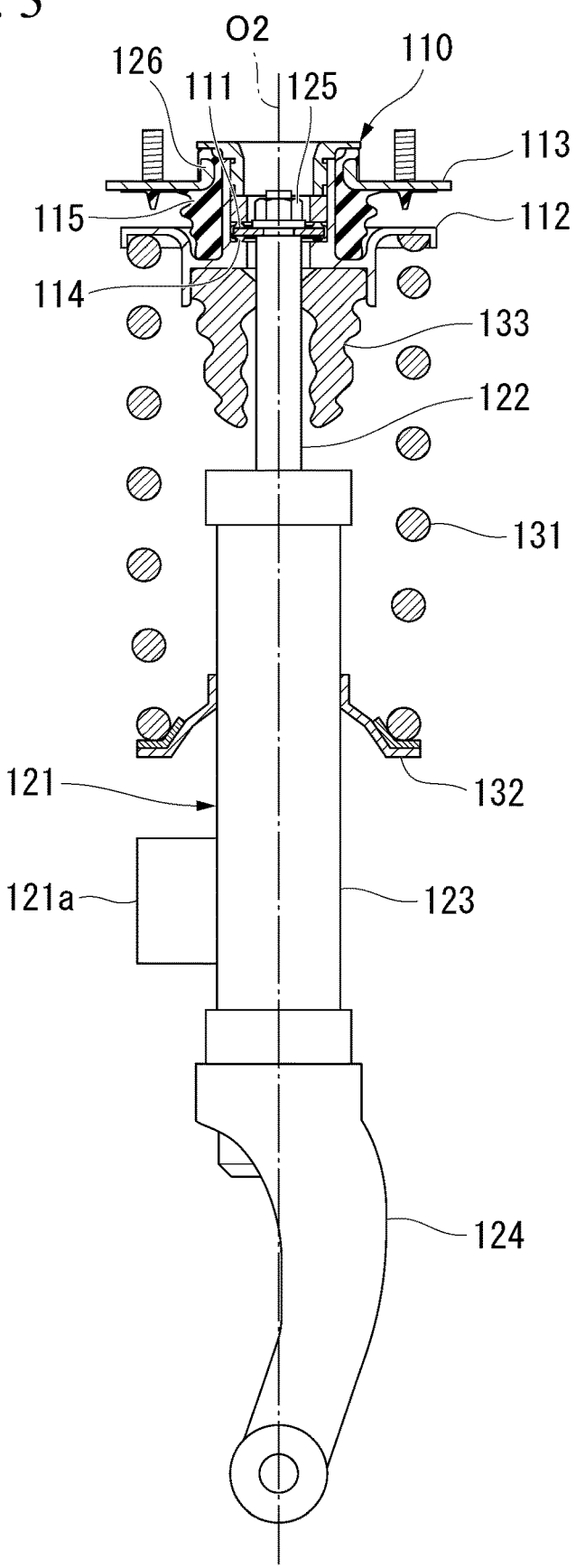
FIG. 3 is a longitudinal sectional view illustrating a state where an active damper is mounted on an active damper upper mount according to a second embodiment of the invention.

Hereinafter, a second embodiment of an active damper upper mount according to the invention will be described referring to FIGS. 3 to 5. An active damper upper mount 110 is applied to, for example, a double-wishbone suspension or the like.

The active damper 121 extends in a substantially upward-downward direction and includes a rod 122 and a cylinder 123. The rod 122 and the cylinder 123 are disposed coaxially with a common axis. Hereinafter, the common axis is referred to as a rod axis O2, and a direction that intersects the rod axis O2 as viewed from the direction of the rod axis O2 is referred to as a radial direction.

The rod 122 protrudes upward from the cylinder 123. A portion of the rod 122 protruding upward from the cylinder 123 is surrounded from the outside in the radial direction by a bump stopper 133. A male thread is formed at an upper end portion of the rod 122. A bracket 124 coupled to an arm member that is not illustrated is attached to a lower end portion of the cylinder 123. A drive unit 121a, which adjusts a damping force exerted by the active damper 121, for example, depending on the frequency or the like of input vibration, is attached to an outer peripheral surface of the cylinder 123. The drive unit 121a includes, for example, a pump or the like. A lower support plate 132, which supports a lower end portion of a spring 131, is attached to the outer peripheral surface of the cylinder 123. The lower support plate 132 is annularly formed and is disposed coaxially with the rod axis O2.

The active damper upper mount 110 includes an inner member 111, an intermediate member 112, an outer member 113, a first elastic body 114, and a second elastic body 115. The upper end portion of the rod 122 of the active damper 121 is fixed to the inner member 111. The intermediate member 112 surrounds the inner member 111 in a circumferential direction around the rod axis O2. The outer member 113 surrounds the intermediate member 112 in the circumferential direction and is attached to a vehicle body side. The first elastic body 114 is disposed between the inner member 111 and the intermediate member 112 and supports the inner member 111 and the intermediate member 112 so as to be elastically displaceable relative to each other. The second elastic body 115 is disposed between the intermediate member 112 and the outer member 113 and supports the intermediate member 112 and the outer member 113 so as to be elastically displaceable relative to each other.

The inner member 111 is annularly formed, and the upper end portion of the rod 122 inserted into the inner member 111.

As a nut 125 is screwed to a portion of the upper end portion of the rod 122 protruding upward from the inner member 111, the active damper 121 is attached to the active damper upper mount 110. The inner member 111 is disposed coaxially with the rod axis O2.

Figure 4:
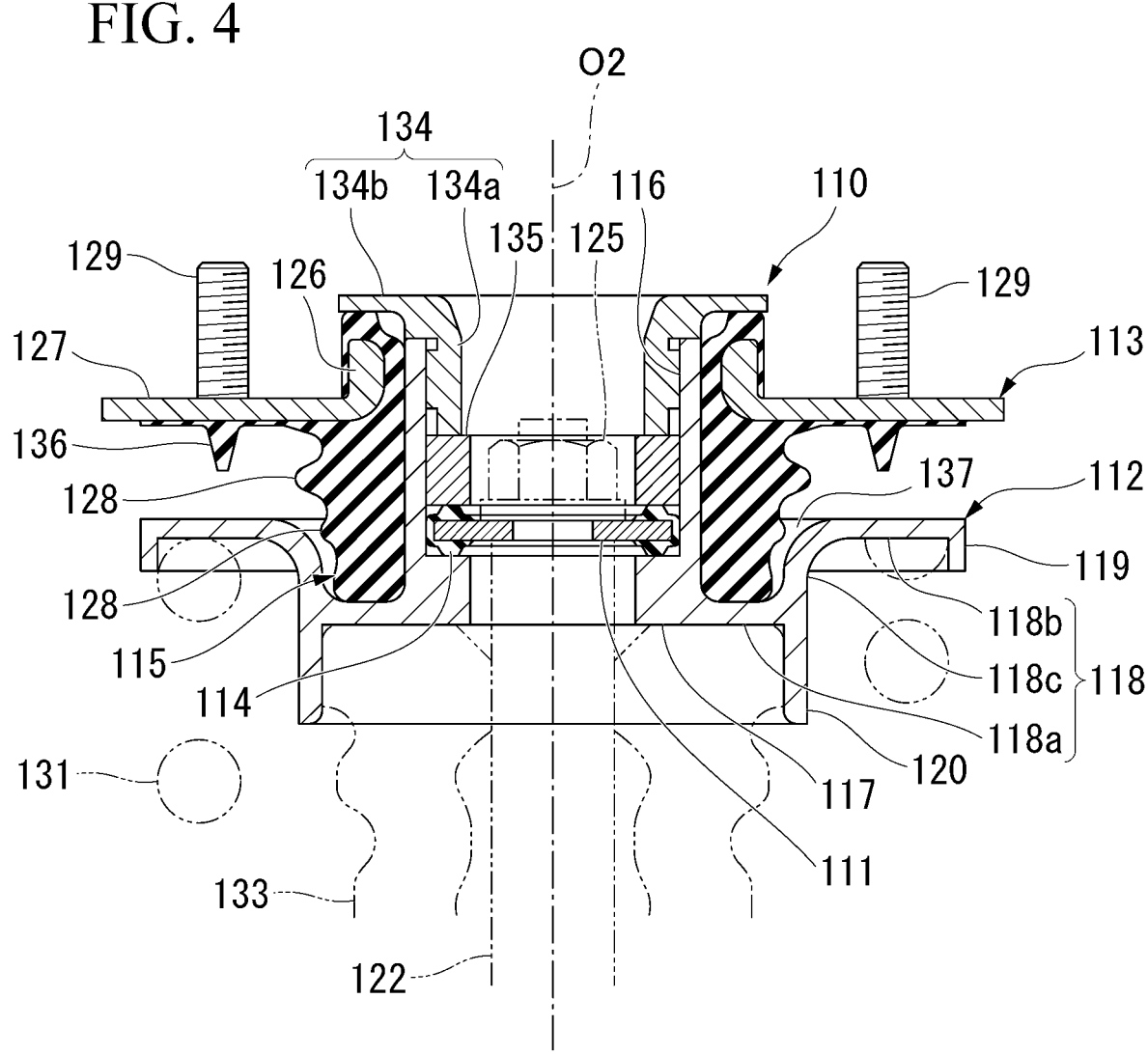
FIG. 4 is an enlarged longitudinal sectional view of the active damper upper mount illustrated in FIG. 3.

The intermediate member 112, as illustrated in FIG. 4, includes a body tube 116, an annular supporting plate 117, an annular support plate 118, an inner tube 120, and an outer tube 119. The body tube 116 extends in the direction of the rod axis O2 and the inner member 111 is disposed in the body tube 116. The annular supporting plate 117 protrudes inward in the radial direction from an inner peripheral surface of the body tube 116. The annular support plate 118 protrudes outward in the radial direction from an outer peripheral surface of the body tube 116. The inner tube 120 protrudes downward from the support plate 118. The outer tube 119 protrudes downward from the support plate 118 and is located radially outside the inner tube 120. The body tube 116, the supporting plate 117, the support plate 118, the outer tube 119, and the inner tube 120 are disposed coaxially with the rod axis O2.

The body tube 116 extends straight in the direction of the rod axis O2.

The portion of the rod 122 protruding upward from the cylinder 123 is inserted into each of the body tube 116 and the supporting plate 117. The supporting plate 117 is located at a lower end portion of the body tube 116. The inner member 111 is disposed inside the body tube 116 at a portion located above the supporting plate 117.

An annular groove 137, which extends in the circumferential direction, is formed in an upper surface of the support plate 118. In the illustrated example, the support plate 118 includes an inner peripheral portion 118a, an outer peripheral portion 118b, and a coupling tube 118c. The inner peripheral portion 118a protrudes outward in the radial direction from an outer peripheral surface in the lower end portion of the body tube 116. The outer peripheral portion 118b is located radially outside and above the inner peripheral portion 118a. The coupling tube 118c couples an outer end of the inner peripheral portion 118a in the radial direction and an inner end of the outer peripheral portion 118b in the radial direction to each other. The annular groove 137 is defined by the outer peripheral surface of the body tube 116, an upper surface of the inner peripheral portion 118a, and an inner peripheral surface of the coupling tube 118c (an outer peripheral surface of the annular groove 137). An outer peripheral edge portion of the inner peripheral portion 118a is formed in the shape of a concavely curved surface that is recessed outward in the radial direction, an inner peripheral edge portion of the outer peripheral portion 118b is formed in the shape of a convexly curved surface that protrudes inward in the radial direction, and the coupling tube 118c extends straight in the direction of the rod axis O2. The respective positions of the outer peripheral portion 118b of the support plate 118 and the inner member 111 in the direction of the rod axis O2 are equal to each other.

The inner tube 120 protrudes downward from a lower end portion of the coupling tube 118c of the support plate 118. An upper end portion of the inner tube 120 is located below a lower end of the outer tube 119. An upper end portion of the bump stopper 133 is fitted inside the inner tube 120.

The outer tube 119 protrudes downward from an outer peripheral edge portion of the support plate 118. An inner peripheral surface of the outer tube 119 and a lower surface of the outer peripheral portion 118b of the support plate 118 support an upper end portion of the spring 131.

The outer member 113 includes a surrounding tube 126 and an annular mounting part 127. The surrounding tube 126 extends in the direction of the rod axis O2 and surrounds the body tube 116 of the intermediate member 112 from the outside in the radial direction. The second elastic body 115 is bonded to the surrounding tube 126. The annular mounting part 127 protrudes outward in the radial direction from the surrounding tube 126, faces the upper surface of the support plate 118 in the direction of the rod axis O2, and is attached to the vehicle body side. The surrounding tube 126 and the mounting part 127 are disposed coaxially with the rod axis O2.

The surrounding tube 126 is formed with a thickness larger than the mounting part 127. The surrounding tube 126 surrounds an upper end portion of the body tube 116 from the outside in the radial direction. The surrounding tube 126 is bonded to an upper end portion of the second elastic body 115. The positions of the upper end opening edges of the surrounding tube 126 and the body tube 116 in the direction of the rod axis O2 are equal to each other. An inner peripheral portion and an outer peripheral portion in the upper end opening edge of the surrounding tube 126 are respectively formed in the shape of a curved surface that protrudes upward, and in a vertical sectional view in the direction of the rod axis O2, the curvature radius of the inner peripheral portion is larger than the curvature radius of the outer peripheral portion. The inner peripheral surface of the surrounding tube 126 is substantially parallel to the outer peripheral surface of the body tube 116. The surrounding tube 126 faces the annular groove 137 in the direction of the rod axis O2 over the entire region thereof in the radial direction. The inner peripheral surface in the lower end portion of the surrounding tube 126 is formed in the shape of a curved surface that protrudes inward in the radial direction, and in the vertical sectional view in the direction of the rod axis O2, this curvature radius is larger than the curvature radius of the inner peripheral portion in the upper end opening edge of the surrounding tube 126.

The mounting part 127 is formed in an annular plate shape that protrudes outward in the radial direction from the lower end portion of the surrounding tube 126. A lower surface of the mounting part 127 faces an upper surface of the outer peripheral portion 118b of the support plate 118 of the intermediate member 112 in the direction of the rod axis O2.

A plurality of through-holes are formed in the mounting part 127 at intervals in the circumferential direction, and the outer member 113 is attached to the vehicle body side by bolts 129 being respectively inserted into the through-holes.

A stopper rubber 136 is disposed on at least one of the mounting part 127 and the support plate 118. The stopper rubber 136 is disposed on the lower surface of the mounting part 127. A lower end portion of the stopper rubber 136 is located above the upper surface of the support plate 118. The stopper rubber 136 faces the upper surface of the outer peripheral portion 118b of the support plate 118 in the direction of the rod axis O2. The stopper rubber 136 is disposed at a portion, on the lower surface of the mounting part 127, located between the through-holes adjacent to each other in the circumferential direction. The stopper rubber 136 extends in the circumferential direction, and the length thereof in the circumferential direction is larger than the size thereof in the direction of the rod axis O2. The thickness of the stopper rubber 136 gradually decreases from the top toward the bottom. The stopper rubber 136 is formed integrally with the second elastic body 115. A plurality of the stopper rubbers 136 are disposed at intervals in the circumferential direction.

Here, a rebound stopper 134 is mounted within the upper end portion of the body tube 116 of the intermediate member 112. The rebound stopper 134 includes a mounting tube 134a fitted within the upper end portion of the body tube 116, and an annular stopper part 134b protruding outward in the radial direction from an upper end portion of the mounting tube 134a. The mounting tube 134a and the stopper part 134b are disposed coaxially with the rod axis O2. An outer peripheral edge portion of the stopper part 134b is located radially outside the body tube 116. The stopper part 134b is located above the surrounding tube 126 of the outer member 113 and faces an upper end opening edge of the surrounding tube 126 in the direction of the rod axis O2. The stopper part 134b faces the upper end opening edge of the surrounding tube 126 over the entire region thereof in the radial direction, in the direction of the rod axis O2.

An annular presser member 135 is disposed within the body tube 116 of the intermediate member 112, and a lower end opening edge of the mounting tube 134a of the rebound stopper 134 abuts or is close to the presser member 135. The presser member 135 is disposed above the inner member 111. The nut 125 is disposed inside the presser member 135.

The second elastic body 115 is formed in a tubular shape having a length in the direction of the rod axis O2 larger than the thickness thereof in the radial direction and is externally fitted to the body tube 116 so as to be slidable in the direction of the rod axis O2. The second elastic body 115 is externally fitted to the body tube 116 over the entire length thereof in the direction of the rod axis O2. A lower end opening edge of the second elastic body 115 is supported on the upper surface of the support plate 118 in a state (hereinafter referred to as an initial mounting state) where the upper end portion of the rod 122 is fixed to the inner member 111 and the outer member 113 is attached to the vehicle body side. In the present embodiment, the lower end opening edge of the second elastic body 115 is supported on the upper surface of the support plate 118 in a stage of the upper mount 110 alone before the aforementioned initial mounting state as illustrated in FIG. 4. The second elastic body 115 abuts the intermediate member 112 and the rebound stopper 134 in a non-bonded state. The body tube 116 is press-fitted inside the second elastic body 115. For example, lubricant, such as grease, is disposed between an inner peripheral surface of the second elastic body 115 and the outer peripheral surface of the body tube 116.

The second elastic body 115 is disposed between the intermediate member 112 and the outer member 113 in a state where the second elastic body 115 is compressively deformed in the direction of the rod axis O2. The second elastic body 115 is vulcanized and bonded to the surrounding tube 126 of the outer member 113 and covers at least the upper end opening edge and the inner peripheral surface of the surrounding tube 126. The outer peripheral portion of the upper end opening edge of the second elastic body 115, which is located at the upper end opening edge of the surrounding tube 126, protrudes above the inner peripheral portion of the upper end opening edge of the second elastic body 115 which is located radially inside the upper end opening edge of the surrounding tube 126. In the upper end opening edge of the second elastic body 115, the outer peripheral portion abuts a lower surface of the stopper part 134b and the inner peripheral portion is separated downward from the lower surface of the stopper part 134b. The second elastic body 115 is also vulcanized and bonded to an inner peripheral edge portion of the lower surface of the mounting part 127 of the outer member 113.

A lower end portion of the second elastic body 115 is inserted into the annular groove 137 of the support plate 118. A gap in the radial direction is provided between an outer peripheral surface of the second elastic body 115, and the inner peripheral surface of the coupling tube 118c of the support plate 118, i.e., the outer peripheral surface of the annular groove 137. Note that the gap in the radial direction may not be provided between the outer peripheral surface of the second elastic body 115 and the outer peripheral surface of the annular groove 137.

A plurality of annular projections 128, which extend in the circumferential direction, are formed on the outer peripheral surface of the second elastic body 115 at intervals in the direction of the rod axis O2. The annular projections 128 are formed in a portion of the outer peripheral surface of the second elastic body 115 located below the outer member 113.

The first elastic body 114 abuts the inner peripheral surface of the body tube 116 and an upper surface of the supporting plate 117 in the intermediate member 112, an upper surface, a lower surface, and an outer peripheral surface of the inner member 111, and, a lower surface of the presser member 135. The first elastic body 114 is compressively deformed in both the direction of the rod axis O2 and the radial direction. The first elastic body 114 abuts the presser member 135, the intermediate member 112, and the inner member 111 in a non-bonded state. Note that the first elastic body 114 may be bonded to at least one of the presser member 135, the intermediate member 112, and the inner member 111.

The thickness, in the direction of the rod axis O2, of a portion of the first elastic body 114 located between the lower surface of the presser member 135 and the upper surface of the inner member 111, and the thickness, in the direction of the rod axis O2, of a portion of the first elastic body 114 located between the upper surface of the supporting plate 117 and the lower surface of the inner member 111 are equal to each other. Note that these thicknesses may be made different from each other.

The volume of the second elastic body 115 is larger than the volume of the first elastic body 114. The thickness of the second elastic body 115 in the radial direction is larger than the thickness of the first elastic body 114.

The length of the second elastic body 115 in the direction of the rod axis O2 is larger than the size of the first elastic body 114 in the direction of the rod axis O2, and the lower end opening edge of the second elastic body 115 is located below the first elastic body 114.

The lower end opening edge of the second elastic body 115 abuts the upper surface of the inner peripheral portion 118a of the support plate 118, i.e., a bottom surface of the annular groove 137.

The first elastic body 114 is formed of a first rubber material having a static spring constant higher than that of a second rubber material that forms the second elastic body 115.

The static spring constant can be measured by the method defined in "Reciprocation System" in Section 6.5 "Testing Method" in Section 6 "Static Spring Characteristics Test" in JIS K 6385:2012. As for measurement conditions (Section 6.4 "Testing Conditions" in JIS K 6385:2012), the test temperature can be equivalent to a usage environment in an applicable vehicle.

tan δ of the second rubber material is larger than tan δ of the first rubber material. tan δ can be measured using a dynamic tensile viscoelasticity measuring device (for example, spectrometer made by Ueshima Seisakusho Co., Ltd.) at a measurement temperature of 25° C., an initial strain of 5%, a dynamic strain of 2%, and a frequency of 10 Hz.

The dynamic spring constant of the first rubber material is lower than the dynamic spring constant of the second rubber material.

A dynamic spring constant Kd can be measured by the method defined in Section 6.1.1 "When Being Based on Load Waveform and Deflection Waveform" in Section 6.1 "Non-resonant Method" in The Society of Rubber Industry, Japan Standard (SRIS) 3503-1990. As for the measurement conditions (Section 4.3 "Specified Conditions of Test" in SRIS 3503-1990), the test temperature can be equivalent to a usage environment in an applicable vehicle, the number of test vibrations can be around an unsprung resonant frequency of the applicable vehicle, and the mean load can be equivalent to spring 1G load of the applicable vehicle, the load amplitude can be a usage condition in the applicable vehicle.

Figure 5:
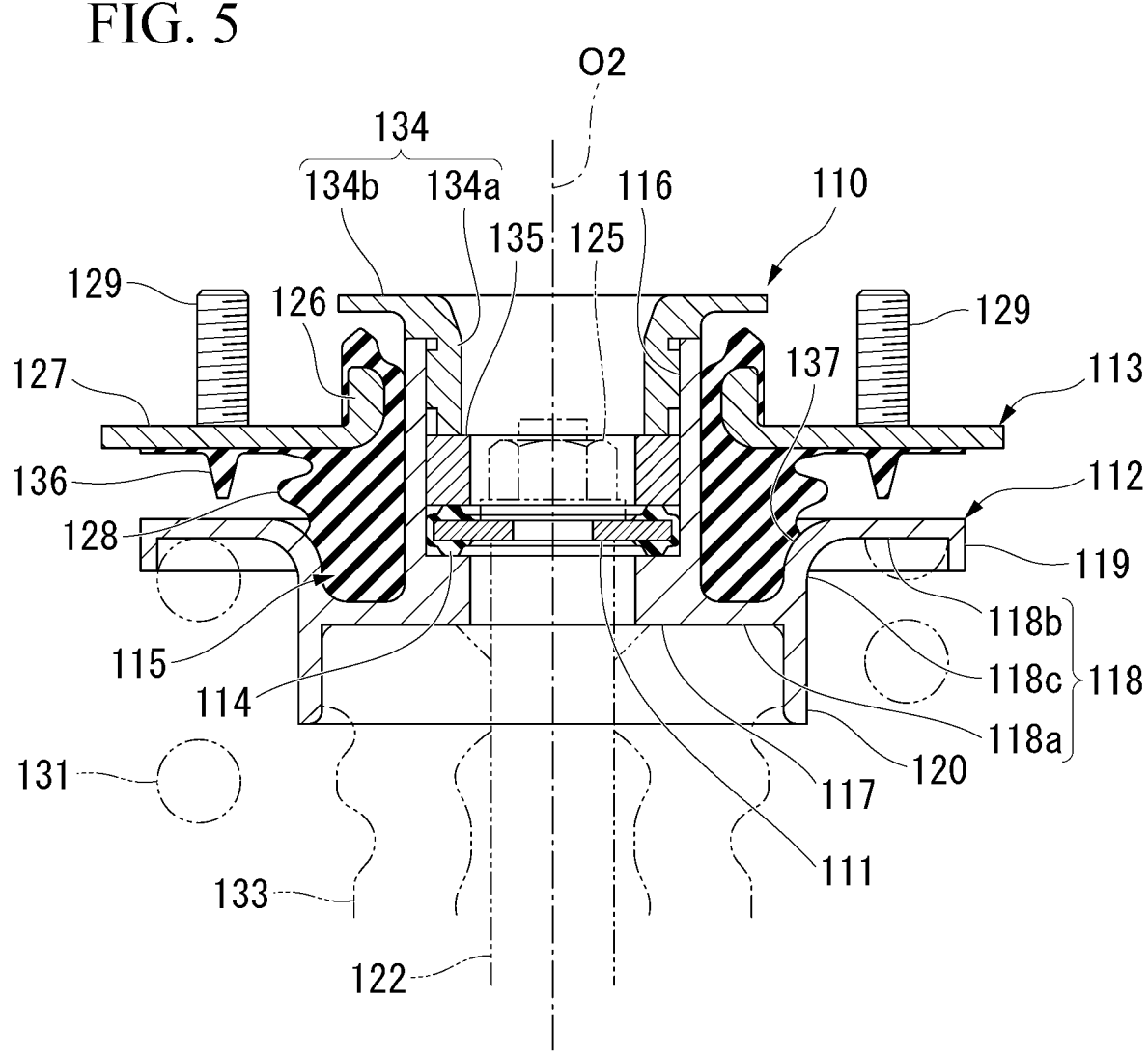
FIG. 5 is an enlarged longitudinal sectional view illustrating a state where the active damper upper mount illustrated in FIG. 3 is mounted on a vehicle.

Next, a state where the active damper upper mount 110 configured as described above is mounted on a vehicle, that is, the aforementioned initial mounting state as illustrated in FIG. 5 will be described.

At least one annular projection 128 located on the uppermost side among the plurality of annular projections 128 is located above the annular groove 137, and an outer edge of the one annular projection 128 in the radial direction is located radially outside the outer peripheral surface of the annular groove 137. In the illustrated example, only one annular projection 128 located on the uppermost side among the plurality of annular projections 128 is located above the annular groove 137. Accordingly, when a compressive load in the direction of the rod axis O2 is input to the second elastic body 115, it is possible to suppress the volume by which the second elastic body 115 protrudes to between the mounting part 127 of the outer member 113 and the outer peripheral portion 118b of the support plate 118, so that the amount of compressive deformation of the second elastic body 115 in the direction of the rod axis O2 can be reliably secured.

The second elastic body 115 is compressively deformed in the direction of the rod axis O2, and the outer peripheral surface of the lower end portion of the second elastic body 115 abuts the outer peripheral surface of the annular groove 137. In this case, the inner peripheral surface of the second elastic body 115 abuts the outer peripheral surface of the body tube 116 substantially over the entire region thereof. The upper end opening edge of the second elastic body 115 is separated downward from the stopper part 134b of the rebound stopper 134 over the entire region thereof in the radial direction. The second elastic body 115 and the outer peripheral surface of the upper end of the body tube 116 are in non-contact with each other. The upper end opening edge of the surrounding tube 126 is located below the upper end opening edge of the body tube 116. The lower end portion of the stopper rubber 136 is located above the upper surface of the support plate 118.

As described above, according to the active damper upper mount 110 of the present embodiment, the second elastic body 115 is disposed between the intermediate member 112 and the outer member 113. Hence, even if the vibration transmitted to the rod 122 from a tire, the drive unit 121a of the active damper 121, or the like, in a state where a large controlling force in the direction of the rod axis O2 is applied to the rod 122 of the active damper 121, is not damped and absorbed by the first elastic body 114, it is possible to damp and absorb this vibration with the second elastic body 115, and transmission of this vibration to a vehicle body can be suppressed.

Additionally, the second elastic body 115 is formed in a tubular shape having a length in the direction of the rod axis O2 larger than the thickness thereof in the radial direction and is externally fitted to the body tube 116 of the intermediate member 112. Hence, the bulkiness of the upper mount 110 in the radial direction caused by disposing the second elastic body 115 can be suppressed.

Additionally, lubricant is disposed between the inner peripheral surface of the second elastic body 115 and the outer peripheral surface of the body tube 116. The second elastic body 115 is externally fitted to the body tube 116 so as to be slidable in the direction of the rod axis O2. Hence, when the intermediate member 112 and the outer member 113 are displaced relative to each other in the direction of the rod axis O2, it is possible to cause the second elastic body 115 and the body tube 116 to slide relative to each other in the direction of the rod axis O2, and it is possible to suppress that a tensile force in the direction of the rod axis O2 is applied to the second elastic body 115. Accordingly, even if the second elastic body 115 is formed in the tubular shape as mentioned above, the durability of the second elastic body 115, and the amount of compressive deformation of the second elastic body 115 in the direction of the rod axis O2 can be reliably secured.

Additionally, the plurality of annular projections 128 are formed on the outer peripheral surface of the second elastic body 115 at intervals in the direction of the rod axis O2. Hence, when a compressive load in the direction of the rod axis O2 is input to the second elastic body 115, the second elastic body 115 is not easily buckled and is easily and compressively deformed straight in the direction of the rod axis O2. Moreover, as the second elastic body 115 is formed in the tubular shape as mentioned above, it is possible to suppress that the spring constant of the second elastic body 115 in the direction of the rod axis O2 becomes low.

Additionally, the length of the second elastic body 115 in the direction of the rod axis O2 is larger than the size of the first elastic body 114 in the direction of the rod axis O2. Hence, even if the thickness of the second elastic body 115 in the radial direction is suppressed, it is possible to secure the volume of the second elastic body 115, and the vibration, which has not been damped and absorbed by the first elastic body 114, can be reliably damped and absorbed by the second elastic body 115.

Additionally, the lower end opening edge of the second elastic body 115 is located below the first elastic body 114. Hence, it is possible to easily secure the length of the second elastic body 115 in the direction of the rod axis O2, and the amount of compressive deformation of the second elastic body 115 in the direction of the rod axis O2 can be reliably secured.

Additionally, the body tube 116 is press-fitted into the second elastic body 115. Hence, even if the second elastic body 115 deteriorates over time, it is possible to suppress that a gap is generated between the inner peripheral surface of the second elastic body 115 and the outer peripheral surface of the body tube 116, and it is possible to reliably suppress that buckling occurs easily due to the deterioration over time when a compressive load in the direction of the rod axis O2 is input to the second elastic body 115.

Additionally, the lower end portion of the second elastic body 115 is inserted into the annular groove 137 of the upper surface of the support plate 118. Hence, the length of the second elastic body 115 in the direction of the rod axis O2 can be easily secure.

Additionally, the gap in the radial direction is provided between the outer peripheral surface of the annular groove 137 and the outer peripheral surface of the second elastic body 115. Hence, when the second elastic body 115 is compressively deformed in the direction of the rod axis O2, it is possible to suppress that the second elastic body 115 protrudes to the portion of the upper surface of the support plate 118 located radially outside the annular groove 137. Hence, it is possible to suppress that the compressive deformation of the second elastic body 115 in the direction of the rod axis O2 is hindered due to this protruding portion being sandwiched between the upper surface of the support plate 118 and the outer member 113 (mounting part 127 of the outer member 113).

Additionally, the outer edge, in the radial direction, of at least one of the plurality of annular projections 128 is located radially outside the outer peripheral surface of the annular groove 137, and a large volume of the annular projections 128 is secured. Hence, when a compressive load in the direction of the rod axis O2 is input to the second elastic body 115, it is possible to reliably suppress that the second elastic body 115 is buckled, and the spring constant of the second elastic body 115 in the direction of the rod axis O2 can be reliably secured.

Additionally, the annular projections 128 are located above the annular groove 137 in the aforementioned initial mounting state. Hence, when the upper mount 110 is mounted on the vehicle, it is possible to prevent the annular projections 128 from being caught by an opening circumferential edge portion of the annular groove 137 in the upper surface of the support plate 118.

Additionally, the stopper rubber 136 is disposed in at least one of the support plate 118 and the outer member 113 (the mounting part 127 of the outer member 113) that face each other in the direction of the rod axis O2. Hence, when the intermediate member 112 and the outer member 113 are moved relatively close to each other in the direction of the rod axis O2, it is possible to compressively deform not only the second elastic body 115 but also the stopper rubber 136 in the direction of the rod axis O2, and even if the second elastic body 115 is formed in the tubular shape as mentioned above, the durability of the second elastic body 115 can be reliably secured.

Additionally, the static spring constant of the first rubber material is higher than the static spring constant of the second rubber material. Hence, even if a large controlling force in the direction of the rod axis O2 is applied to the rod 122 of the active damper 121, it is possible to suppress that the first elastic body 114 is largely compressively deformed in the direction of the rod axis O2, and becomes excessively hard. Hence, the vibration transmitted to the rod 122 from a tire, the drive unit 121a of the active damper 121, or the like, in a state where a large control force in the direction of the rod axis O2 is applied to the rod 122 of the active damper 121, can be damped and absorbed not only by the second elastic body 115 but also by the first elastic body 114 irrespective of the height of frequency, and the transmission of this vibration to the vehicle body can be suppressed.

Additionally, since the amount of compressive deformation of the first elastic body 114 in the direction of the rod axis O2 is suppressed, it is possible to suppress the load applied to the first elastic body 114, and the durability of the first elastic body 114 can also be secured.

Particularly, the first elastic body 114 and the second elastic body 115 are separately disposed between the inner member 111 and the intermediate members 112 on a vibration generation unit side to which the rod 122 is fixed and between the outer member 113 and the intermediate members 112 on a vibration reception unit side attached to the vehicle body side. That is, the intermediate member 112 is sandwiched by the first elastic body 114 and the second elastic body 115 between the vibration generation unit side and the vibration reception unit side. Hence, when high-frequency vibration is transmitted to the rod 122 from a tire, the drive unit 121a of the active damper 121, or the like, the intermediate member 112 can be made difficult to vibrate due to the inertia weight thereof. In other words, the intermediate member 112 can be made to act as a mass of a dynamic damper. Hence, the transmission of the high-frequency vibration to the vehicle body can be reliably suppressed.

Additionally, tan δ of the second rubber material is larger than tan δ of the first rubber material. Hence, when the intermediate member 112 tries to resonate due to the vibration transmitted to the rod 122 as mentioned above, this resonance can be suppressed by the damping force of the second elastic body 115.

Additionally, tan δ of the second rubber material with the low static spring constant is larger than tan δ of the first rubber material with the high static spring constant. Hence, the high-frequency vibration transmitted to the rod 122 from a tire, the drive unit 121a of the active damper 121, or the like can be effectively damped and absorbed by the second elastic body 115, and the transmission of this vibration to the vehicle body can be suppressed.

Additionally, the dynamic spring constant of the first rubber material is lower than the dynamic spring constant of the second rubber material. Hence, the high-frequency vibration transmitted to the rod 122 from a tire, the drive unit 121a of the active damper 121, or the like can be effectively and easily damped and absorbed by the first elastic body 114 before being transmitted to the second elastic body 115, and the transmission of this vibration to the vehicle body can be reliably suppressed.

Additionally, the second elastic body 115 is bonded to the surrounding tube 126 of the outer member 113 that extends in the direction of the rod axis O2 and surrounds the body tube 116 from the outside in the radial direction, and the surrounding tube 126 is externally fitted to the body tube 116 via the second elastic body 115. Hence, even if the thickness of the second elastic body 115 in the radial direction located between the surrounding tube 126 and the body tube 116 is not increased, it is possible to determine the relative radial positions of the outer member 113 and the intermediate member 112, and the bulkiness of the upper mount 110 in the radial direction caused by disposing the second elastic body 115 can be reliably suppressed.

Additionally, lubricant is disposed between the inner peripheral surface of the second elastic body 115 and the outer peripheral surface of the body tube 116. The second elastic body 115 is externally fitted to the body tube 116 so as to be slidable in the direction of the rod axis O2. Hence, when the intermediate member 112 and the outer member 113 are displaced relative to each other in the direction of the rod axis O2, it is possible to cause the second elastic body 115 and the body tube 116 to slide relative to each other in the direction of the rod axis O2, and it is possible to suppress that a tensile force in the direction of the rod axis O2 is applied to the second elastic body 115.

Accordingly, even if the second elastic body 115 is formed in the tubular shape and the thickness of the second elastic body 115 in the radial direction located between the surrounding tube 126 and the body tube 116 is reduced, the durability of the second elastic body 115, and the amount of compressive deformation of the second elastic body 115 in the direction of the rod axis O2 can be reliably secured.

Additionally, lubricant is disposed between the inner peripheral surface of the second elastic body 115 and the outer peripheral surface of the body tube 116. Hence, when the intermediate member 112 and the outer member 113 are displaced relative to each other in the direction of the rod axis O2, it is possible to reliably suppress that a tensile force in the direction of the rod axis O2 is applied to the second elastic body 115.

Note that the technical scope of the invention is not limited to the above embodiment, and various changes can be made without departing the spirit of the invention.

In the above embodiment, the body tube 116 is press-fitted into the second elastic body 115. However, the body tube 116 may be inserted into the second elastic body 115 in a state where the inner peripheral surface of the second elastic body 115 is not pressed outward in the radial direction.

The annular groove 137 may not be formed in the upper surface of the support plate 118.

The stopper rubber 136 is disposed in the outer member 113. However, the stopper rubber 136 may be disposed in the support plate 118, or a configuration having no stopper rubber 136 may be adopted.

In the above embodiment, the outer peripheral surface of the second elastic body 115 abuts the outer peripheral surface of the annular groove 137 in the aforementioned initial mounting state as illustrated in FIG. 5. However, the outer peripheral surface of the second elastic body 115 may be separated inward in the radial direction from the outer peripheral surface of the annular groove 137.

In the above embodiment, in the aforementioned initial mounting state, the upper end opening edge of the second elastic body 115 is separated downward from the stopper part 134b of the rebound stopper 134. However, the upper end opening edge of the second elastic body 115 may be caused to abut the stopper part 134b.

In the above embodiment, in the aforementioned initial mounting state, the outer peripheral surface of the upper end portion of the body tube 116 and the second elastic body 115 are in non-contact with each other. However, the second elastic body 115 may be caused to abut the outer peripheral surface of the body tube 116 over the entire length thereof in the direction of the rod axis O2.

In the above embodiment, in the aforementioned initial mounting state, the upper end opening edge of the surrounding tube 126 is located below the upper end opening edge of the body tube 116. However, the upper end opening edge of the surrounding tube 126 may be located at the position in the direction of the rod axis O2 equal to the upper end opening edge of the body tube 116 or may be located above the upper end opening edge of the body tube 116.

In the above embodiment, in the aforementioned initial mounting state, the lower end portion of the stopper rubber 136 is located above the upper surface of the support plate 118. However, the lower end portion of the stopper rubber 136 may be caused to abut the upper surface of the support plate 118.

In the above embodiment, a configuration including the rebound stopper 134, the presser member 135, and the surrounding tube 126 of the outer member 113 has been shown. However, a configuration having no these may be adopted.

In the above embodiment, a configuration in which the second elastic body 115 has a portion located between the surrounding tube 126 of the outer member 113 and the stopper part 134*b* of the rebound stopper 134 has been shown. However, a configuration having no this portion may be adopted.

In the above embodiment, a configuration in which the static spring constant of the first rubber material is higher than the static spring constant of the second rubber material has been shown. However, the static spring constant of the first rubber material may be equal to or lower than the static spring constant of the second rubber material.

In the above embodiment, a configuration in which tan δ of the second rubber material is larger than tan δ of the first rubber material has been shown. However, tan δ of the second rubber material may be equal to or lower than tan δ of the first rubber material.

In the above embodiment, a configuration in which the dynamic spring constant of the first rubber material is lower than the dynamic spring constant of the second rubber material has been shown. However, the dynamic spring constant of the first rubber material may be equal to or more than the dynamic spring constant of the second rubber material.

In the above embodiment, the length of the second elastic body 115 in the direction of the rod axis O2 is larger than the size of the first elastic body 114 in the direction of the rod axis O2. However, the length of the second elastic body 115 in the direction of the rod axis O2 may be equal to or smaller than the size of the first elastic body 114 in the direction of the rod axis O2.

In the above embodiment, the lower end opening edge of the second elastic body 115 is located below the first elastic body 114. However, the lower end opening edge of the second elastic body 115 may be located at the position in the direction of the rod axis O2 equal to the first elastic body 114 or may be located above the first elastic body 114.

Although the plurality of annular projections 128 are formed on the second elastic body 115, the annular projections 128 may not be formed.

In the above embodiment, although lubricant is disposed between the inner peripheral surface of the second elastic body 115 and the outer peripheral surface of the body tube 116, the lubricant may not be disposed therebetween.

In addition, it is possible to appropriately replace the constituent elements in the above-described embodiments with well-known constituent elements without departing from the spirit of the invention. Additionally, the above-described modification examples may be combined appropriately.

INDUSTRIAL APPLICABILITY

According to this invention, vibration transmitted to a rod of an active damper from a tire, a drive unit of an active damper, or the like, in a state where a large control force in a direction of a rod axis is applied to the rod, can be damped and absorbed irrespective of the height of frequency.

REFERENCE SIGNS LIST

10, 110: Active damper upper mount
11, 111: Inner member
12, 112: Intermediate member
13, 113: Outer member
14, 114: First elastic body
15, 115: Second elastic body
16, 116: Body tube
21, 121: Active damper
22, 122: Rod
118: Support plate
128: Annular projection
136: Stopper rubber
137: Annular groove
O1, O2: Rod axis

The invention claimed is:

1. An active damper upper mount comprising:
   an inner member to which an upper end portion of a rod of an active damper is fixed;
   an intermediate member that surrounds the inner member in a circumferential direction around a rod axis;
   an outer member that surrounds the intermediate member in the circumferential direction and is attached to a vehicle body side;
   a first elastic body that is disposed between the inner member and the intermediate member and supports the inner member and the intermediate member so as to be elastically displaceable relative to each other; and
   a second elastic body that is disposed between the intermediate member and the outer member and supports the intermediate member and the outer member so as to be elastically displaceable relative to each other,
   wherein the intermediate member includes a body tube in which the inner member is disposed, and an annular support plate that protrudes outward in a radial direction from an outer peripheral surface of the body tube,
   wherein the second elastic body is formed in a tubular shape having a length in a direction of the rod axis larger than a thickness thereof in the radial direction, and is externally fitted to the body tube so as to be slidable in the direction of the rod axis,
   wherein a plurality of annular projections, which extend in the circumferential direction, are formed on an outer peripheral surface of the second elastic body at intervals in the direction of the rod axis,
   wherein a lower end opening edge of the second elastic body is supported on an upper surface of the support plate in a state where the upper end portion of the rod is fixed to the inner member and the outer member is attached to the vehicle body side,
   wherein the length of the second elastic body in the direction of the rod axis is larger than a size of the first elastic body in the direction of the rod axis, and the lower end opening edge of the second elastic body is located below the first elastic body, and wherein lubricant is disposed between an inner peripheral surface of the second elastic body and an outer peripheral surface of the body tube.

2. The active damper upper mount according to claim 1, wherein the body tube is press-fitted into the second elastic body.

3. The active damper upper mount according to claim 1, wherein an annular groove into which a lower end portion of the second elastic body is inserted is formed in the upper surface of the support plate, and wherein a gap in the radial direction is provided between an outer peripheral surface of an internal surface of the annular groove that faces inward in the radial direction and the outer peripheral surface of the second elastic body.

4. The active damper upper mount according to claim 1, wherein the support plate and the outer member face each other in the direction of the rod axis, and a stopper rubber is disposed in at least one of the support plate and the outer member.

5. An active damper upper mount comprising:
an inner member to which an upper end portion of a rod of an active damper is fixed;
an intermediate member that surrounds the inner member in a circumferential direction around a rod axis;
an outer member that surrounds the intermediate member in the circumferential direction and is attached to a vehicle body side;
a first elastic body that is disposed between the inner member and the intermediate member and supports the inner member and the intermediate member so as to be elastically displaceable relative to each other; and
a second elastic body that is disposed between the intermediate member and the outer member and supports the intermediate member and the outer member so as to be elastically displaceable relative to each other,
wherein the intermediate member includes a body tube in which the inner member is disposed and which extends in a direction of the rod axis, and an annular support plate that protrudes outward in a radial direction from an outer peripheral surface of the body tube,
wherein the second elastic body is formed in a tubular shape having a length in the direction of the rod axis larger than a thickness thereof in the radial direction, and is externally fitted to the body tube so as to be slidable in the direction of the rod axis,
wherein a lower end opening edge of the second elastic body is supported on an upper surface of the support plate in a state where the upper end portion of the rod is fixed to the inner member and the outer member is attached to the vehicle body side,
wherein lubricant is disposed between an inner peripheral surface of the second elastic body and the outer peripheral surface of the body tube, and
wherein the outer member includes a surrounding tube which extends in the direction of the rod axis and surrounds the body tube from the outside in the radial direction, and to which the second elastic body bonded, and an annular mounting part that protrudes outward in the radial direction from the surrounding tube, faces the support plate in the direction of the rod axis, and is attached to the vehicle body side.

6. The active damper upper mount according to claim 5, wherein a plurality of annular projections, which extend in the circumferential direction, are formed on an outer peripheral surface of the second elastic body at intervals in the direction of the rod axis.

7. The active damper upper mount according to claim 5, wherein the length of the second elastic body in the direction of the rod axis is larger than a size of the first elastic body in the direction of the rod axis, and the lower end opening edge of the second elastic body is located below the first elastic body.

8. The active damper upper mount according to claim 5, wherein the body tube is press-fitted into the second elastic body.

9. The active damper upper mount according to claim 5, wherein an annular groove into which a lower end portion of the second elastic body is inserted is formed in the upper surface of the support plate, and wherein a gap in the radial direction is provided between an outer peripheral surface of an internal surface of the annular groove that faces inward in the radial direction and an outer peripheral surface of the second elastic body.

10. The active damper upper mount according to claim 5, wherein a stopper rubber is disposed in at least one of the support plate and the mounting part.

11. An active damper upper mount comprising:
an inner member to which an upper end portion of a rod of an active damper is fixed;
an intermediate member that surrounds the inner member in a circumferential direction around a rod axis;
an outer member that surrounds the intermediate member in the circumferential direction and is attached to a vehicle body side;
a first elastic body that is disposed between the inner member and the intermediate member and supports the inner member and the intermediate member so as to be elastically displaceable relative to each other; and
a second elastic body that is disposed between the intermediate member and the outer member and supports the intermediate member and the outer member so as to be elastically displaceable relative to each other,
wherein the intermediate member includes a body tube in which the inner member is disposed, and an annular support plate that protrudes outward in a radial direction from an outer peripheral surface of the body tube,
wherein the second elastic body is formed in a tubular shape having a length in a direction of the rod axis larger than a thickness thereof in the radial direction, and is externally fitted to the body tube so as to be slidable in the direction of the rod axis,
wherein a plurality of annular projections, which extend in the circumferential direction, are formed on an outer peripheral surface of the second elastic body at intervals in the direction of the rod axis,
wherein a lower end opening edge of the second elastic body is supported on an upper surface of the support plate in a state where the upper end portion of the rod is fixed to the inner member and the outer member is attached to the vehicle body side,
wherein an annular groove into which a lower end portion of the second elastic body is inserted is formed in the upper surface of the support plate, and
wherein at least one annular projection located on an uppermost side among the plurality of annular projections is located above the annular groove in a state where the upper end portion of the rod is fixed to the inner member and the outer member is attached to the vehicle body side, and an outer edge of the one annular projection in the radial direction is located radially outside an outer peripheral surface of an internal surface of the annular groove that faces inward in the radial direction.

12. The active damper upper mount according to claim 11, wherein a gap in the radial direction is provided between an outer peripheral surface of the annular groove and the outer peripheral surface of the second elastic body.

13. The active damper upper mount according to claim 11, wherein lubricant is disposed between an inner peripheral surface of the second elastic body and the outer peripheral surface of the body tube.

14. The active damper upper mount according to claim 11, wherein the length of the second elastic body in the direction of the rod axis is larger than a size of the first elastic body in the direction of the rod axis, and the lower end opening edge of the second elastic body is located below the first elastic body.

15. The active damper upper mount according to claim 11, wherein the body tube is press-fitted into the second elastic body.

16. The active damper upper mount according to claim 11, wherein the support plate and the outer member face each other in the direction of the rod axis, and a stopper rubber is disposed in at least one of the support plate and the outer member.

* * * * *